3,022,266
PROCESS FOR THE PREPARATION OF
ACRYLONITRILE COPOLYMERS
Karl Meinel, Burghausen, Upper Bavaria, Germany, assignor to Wacker-Chemie G.m.b.H., Munich, Germany, a firm of Germany
No Drawing. Filed Dec. 16, 1959, Ser. No. 859,839
Claims priority, application Germany Dec. 18, 1958
2 Claims. (Cl. 260—45.5)

The present invention relates to a new and improved process for the production of polymers of acrylamide and copolymers of acrylamide with acrylonitrile and acrylic acid.

This application is a continuation-in-part of copending application Serial No. 534,382, filed September 14, 1955, now abandoned.

In the foregoing application, novel processes for the production of polymers of acrylamide and copolymers of acrylamide with acrylic acid and acrylonitrile are described. In said processes, the acrylonitrile in a reaction mixture containing said acrylonitrile and a strong acid is hydrolyzed to yield acrylamide, and in some instances minor amounts of acrylic acid, the reaction mixture thus obtained is then diluted with water to reduce the acid concentration and the polymerizable monomers formed then subjected to polymerization in the presence of a polymerization initiating redox system. Preferably, the acid hydrolysis of the acrylonitrile is carried out in the presence of a salt of a metal of the third to the eighth group of the periodic system, or methylene blue which act as a polymerization inhibitor under the hydrolysis conditions. Polymerization of the monomers present is effected after dilution with water by the addition of an oxygen-rich compound such as ammonium persulfate, the metal salt in combination with the ammonium persulfate acting to form a polymerization initiating redox system. Desirable polymers and copolymers are obtained by the process described. One of the less desirable characteristics of these polymers and copolymers is their tendency to agglomerate during the polymerization reaction and to precipitate in the form of relatively large clusters which are difficult to wash free of acid in a desirably short time unless they are brought into a more finely-divided form.

It is, therefore, an important object of this invention to provide an improved process for the acid polymerization of the acid hydrolysis and condensation products of acrylonitrile with acrylonitrile in accordance with the process described in which the polymers obtained precipitate from the reaction medium in the form of finely-divided discrete particles which are readily washed and may be further processed into molded objects having excellent mechanical properties.

Other objects of this invention will appear from the following detailed description.

In accordance with the process of this invention these improved polymers are obtained if acrylonitrile is hydrolyzed and condensed at a temperature of 80° C. to 120° C. in an 80% to 95% by weight sulfuric acid solution containing from 0.5 to 0.6 mol of water for each mol of acrylonitrile present and a salt of a metal of the third to the eighth group of the periodic system together with an oxidizable organic compound yielding products on reaction with sulfuric acid capable of constituting a redox system, the sulfuric acid solution then diluted with water to an acid concentration of 2% to 70% by weight of acid, acrylonitrile and a peroxide or persulfate polymerization catalyst added and the monomeric compounds present subjected to polymerization at a temperature of at most 100° C. The initial hydrolysis reaction of the acrylonitrile in the sulfuric acid solution, prior to dilution, is immediate. In lieu of the added acrylonitrile, styrene may be employed in forming said copolymers.

Examples of readily oxidizable organic compounds which may be employed in the present process are carbohydrates such as glucose and starch, high molecular weight organic compounds such as cellulose and organic polymers such as the various ethoxylin resins, especially those having a molecular weight of about 3800, as well as organic compounds such as reductones, for example ascorbic acid.

Relatively small amounts of these readily oxidizable organic compounds need be present in the reaction medium to yield the desired result. Usually from 0.001 to 1% by weight of these organic compounds based on the weight of the monomer present in the reaction medium is quite satisfactory in order to produce the polymers which separate from the polymerization reaction medium in the form of finely-divided discrete particles and which yield molded objects having the improved mechanical properties sought. In addition, the present process yields polymers which are noticeably lighter in shade and which have improved tensile strength, bending strength and impact resistance as compared to similar polymers where said organic compound is absent, as well as greatly improved mechanical properties when machined, including drilling, tapping and turning as well as milling.

As pointed out in the parent application referred to above, the polymerization catalyst is an oxygen-rich reagent such as a persulfate or a peroxide, the catalyst preferably employed being ammonium persulfate. In the instant process the salt of a metal of the third to the eighth group of the periodic system functions as a polymerization retarder in the initial stage of the reaction but on dilution of the reaction medium with water after hydrolysis the inhibitor ceases to be functional in this aspect. The salts are preferably those of metals which are capable of yielding ions in a valency state which is less than that of maximum valency and the most effective are the ferrous, cuprous, chromous, cobaltus, nickelous and aluminium salts. Methylene blue, either alone or in combination with one or more salts may also be advantageously employed. Ferrous salts are particularly preferred as they inhibit polymerization quite efficiently during the hydrolysis and condensation of the acrylonitrile but after dilution of the reaction medium with water they effectively aid the desired polymerization of the monomers present. The polymerization initiating redox system comprises the combination of the metal salt in the diluted reaction medium and the oxygen-rich peroxide or persulfate polymerization catalyst which is added.

In order further to illustrate this invention, but without being limited thereto, the following examples are given:

*Example 1*

0.635 part by weight of acrylonitrile are added with stirring to 1.24 parts by weight of 90% sulfuric acid at a temperature of 95° C. to 100° to which have been added 0.025 part by weight of ferrous sulfate, 0.09 part by weight of methylene blue and 0.067 part by weight of an ethoxylin resin having a molecular weight of 3800. The solution obtained is diluted with 1.24 parts by weight of water and, after the addition of 0.014 part by weight of acetylene and an additional 0.365 part by weight of acrylonitrile, polymerization is effected with stirring at a temperature of 75° C. to 97° C. after an aqueous solution containing 0.01 part by weight of ammonium persulfate as polymerization catalyst is added. The finely-divided copolymer slurry formed on polymerization is filtered off, washed free of acid and then dried. The finely-divided copolymer is obtained in a yield of 90% to 97% of theory. The copolymer can be readily molded at pressures of about 60 kg./cm.$^2$ and temperatures of 170° C. to 180° C. to yield shaped objects having a somewhat brownish tint and which have a softening temperature of about 170° C. The molded objects obtained are quite hard and have a flow point of 10,000 kg./cm.$^2$ and a compressive strength of about 2.2 tons/cm.$^2$. In spite of their superior hardness they exhibit excellent working qualities and machining characteristics.

*Example 2*

0.635 part by weight of acrylonitrile are added to 1.24 parts by weight of 90% sulfuric acid at 95° C. to 100° C. with stirring, the sulfuric acid containing 0.1 part by weight of ferrous sulfate and 0.067 part by weight of ethoxylin resin having a molecular weight of 3800. Then 1.24 parts by weight of water and 0.014 part by weight of acetylene as well as 0.365 part by weight of acrylonitrile are added, polymerization is effected with stirring by the addition of an aqueous solution containing 0.01 part by weight of ammonium persulfate while maintaining the temperature at from 75° C. to 97° C. The finely-divided copolymer obtained is filtered off, washed free of acid and dried. The copolymer obtained has a bright, faintly yellow color and the yield is about 90% to 96% of theory. This copolymer can be molded into almost transparent bright yellow objects at a temperature of 170° C. to 180° C. and under a pressure of 50 kg./cm.$^2$. These have a softening temperature of about 170° C. This copolymer has a flow point of 10,000 kg./cm.$^2$ and a compressive strength of 2.7 tons/cm.$^2$.

$$\underset{CH_2-CH-CH_2}{\overset{O}{\diagdown\diagup}}-\left[O-\underset{}{\bigcirc}-\underset{CH_3}{\overset{CH_3}{\underset{|}{C}}}-\underset{}{\bigcirc}-O-CH_2-\underset{OH}{\overset{|}{C}H}-CH_2\right]_n-O-\underset{}{\bigcirc}-\underset{CH_3}{\overset{CH_3}{\underset{|}{C}}}-\underset{}{\bigcirc}-O-CH_2-\underset{CH-CH_2}{\overset{O}{\diagdown\diagup}}$$

The copolymer has excellent mechanical working properties.

*Example 3*

A copolymer is formed in the manner described in Example 2 but in place of using an ethoxylin resin having a molecular weight of 3800 one having a molecular weight of 2900 is employed. The copolymer resin obtained has similar properties to the resin described in Example 2 and has substantially the same physical characteristics and mechanical working qualities.

*Example 4*

A copolymer is produced in accordance with the process $$\underset{CH_2-CH-CH_2}{\overset{O}{\diagdown\diagup}}-\left[O-\underset{}{\bigcirc}-\underset{CH_3}{\overset{CH_3}{\underset{|}{C}}}-\underset{}{\bigcirc}-O-CH_2-\underset{OH}{\overset{|}{C}H}-CH_2\right]_n-O-\underset{}{\bigcirc}-\underset{CH_3}{\overset{CH_3}{\underset{|}{C}}}-\underset{}{\bigcirc}-O-CH_2-\underset{CH-CH_2}{\overset{O}{\diagdown\diagup}}$$

described in Example 2 except that the amount of ethoxylin resin employed is reduced in amount to 0.007 part by weight. The copolymer formed precipitates in the form of fine particles which are somewhat larger than those obtained by the procedure of Example 2.

*Example 5*

The process of Example 3 is repeated but the amount of ethoxylin resin employed is reduced in amount to 0.33 part by weight. The copolymer formed precipitates in the form of fine, flour-like particles. Molded objects formed from this copolymer employing the conditions described in Example 2 exhibit a compressive strength of 3 tons/cm.$^2$.

*Example 6*

A copolymer is obtained in accordance with the process of Example 2 but instead of employing only ethoxylin resin, 10% by weight of phthalic acid anhydride is employed in admixture with it. The copolymer formed is obtained as a yellowish powder. When molded, this copolymer yields objects having a compressive strength of 2.5 tons/cm.$^2$. The mechanical working properties of the molded copolymer are excellent.

*Example 7*

The procedure described in Example 2 is repeated with the exception that only 0.635 part by weight of acrylonitrile are employed. The copolymer formed precipitates from the reaction medium in the form of particles or granules yellow in color and similar in appearance to fine gravel. However, the particle size is considerably finer than polymers formed without any ethoxylin resin being present in the reaction medium. The polymer is obtained in a yield of 91%. It softens at a temperature of 165° C. and molded blanks are easily milled or turned on a lathe.

In the several examples given above in place of the ethoxylin resin employed, one may employ with equally satisfactory results other organic compounds such as glucose, starch, cellulose, ascorbic acid or other organic compounds readily oxidizable in the sulfuric acid redox system in which the polymerization is effected. It is also possible to employ mixtures of several of these compounds.

The term "reductone" is amply discussed in the literature and a more comprehensive treatment of the subject may be found in L. Zechmeister, "Fortschritte der Chemie Organischer Naturstoffe" (1939), published by S. Springer, Vienna.

The ethoxylin resins preferably employed are those which have a molecular weight of 2000 to 4000 or more and are of the general structural formula:

wherein $n$ is an integer.

I claim:

1. Process for the production of copolymers of acrylonitrile, which comprises hydrolyzing and condensing acrylonitrile in an aqueous hydrolysis medium comprising an 80% to 95% by weight sulfuric acid solution containing 0.5 to 0.6 mol of water for each mol of acrylonitrile present while at a temperature of 80° C. to 120° C., said aqueous medium containing a member of the group consisting of a sulfate of a metal of the third to the eighth group of the periodic system, and also an ethoxylin resin of the formula:

having a molecular weight of 2000 to 4000 and wherein $n$ is an integer, diluting the reaction mixture with water, whereby the sulfuric acid concentration is reduced to 2% to 70% by weight, adding acrylonitrile persulfate polymerization catalyst and causing the polymerizable monomers present to undergo polymerization while maintaining the reaction medium at a temperature of from 70° C. to 100° C.

2. Process in accordance with claim 1 wherein the ethoxylin resin is present in an amount of from 0.001 to 1% by weight of the monomer.

References Cited in the file of this patent

UNITED STATES PATENTS

| | | |
|---|---|---|
| 2,629,712 | Stanin | Feb. 24, 1953 |
| 2,734,915 | Jones | Feb. 14, 1956 |
| 2,813,088 | Meinel | Jan. 26, 1960 |
| 2,922,768 | Mino et al. | Jan. 26, 1960 |

FOREIGN PATENTS

| | | |
|---|---|---|
| 599,472 | Great Britain | Mar. 12, 1948 |